June 7, 1966  P. RAUHUT  3,255,368
ARMATURE WINDING FOR ALTERNATING CURRENT COMMUTATOR MACHINE
Filed March 3, 1960  5 Sheets-Sheet 2
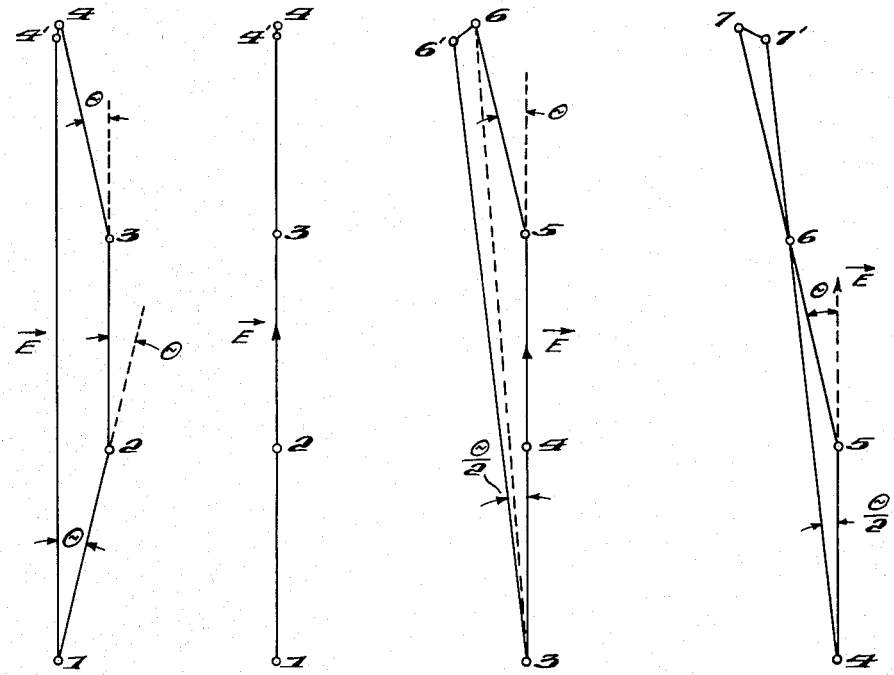
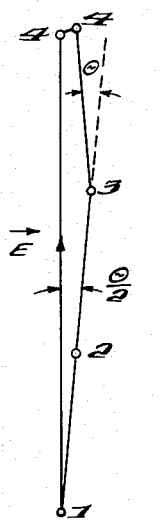
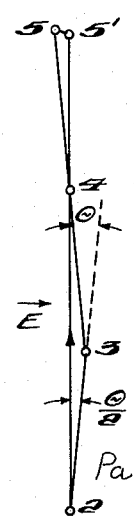
INVENTOR
Paul Rauhut
BY Pierce, Scheffler & Parker
ATTORNEYS June 7, 1966 P. RAUHUT 3,255,368
ARMATURE WINDING FOR ALTERNATING CURRENT COMMUTATOR MACHINE
Filed March 3, 1960 5 Sheets-Sheet 3
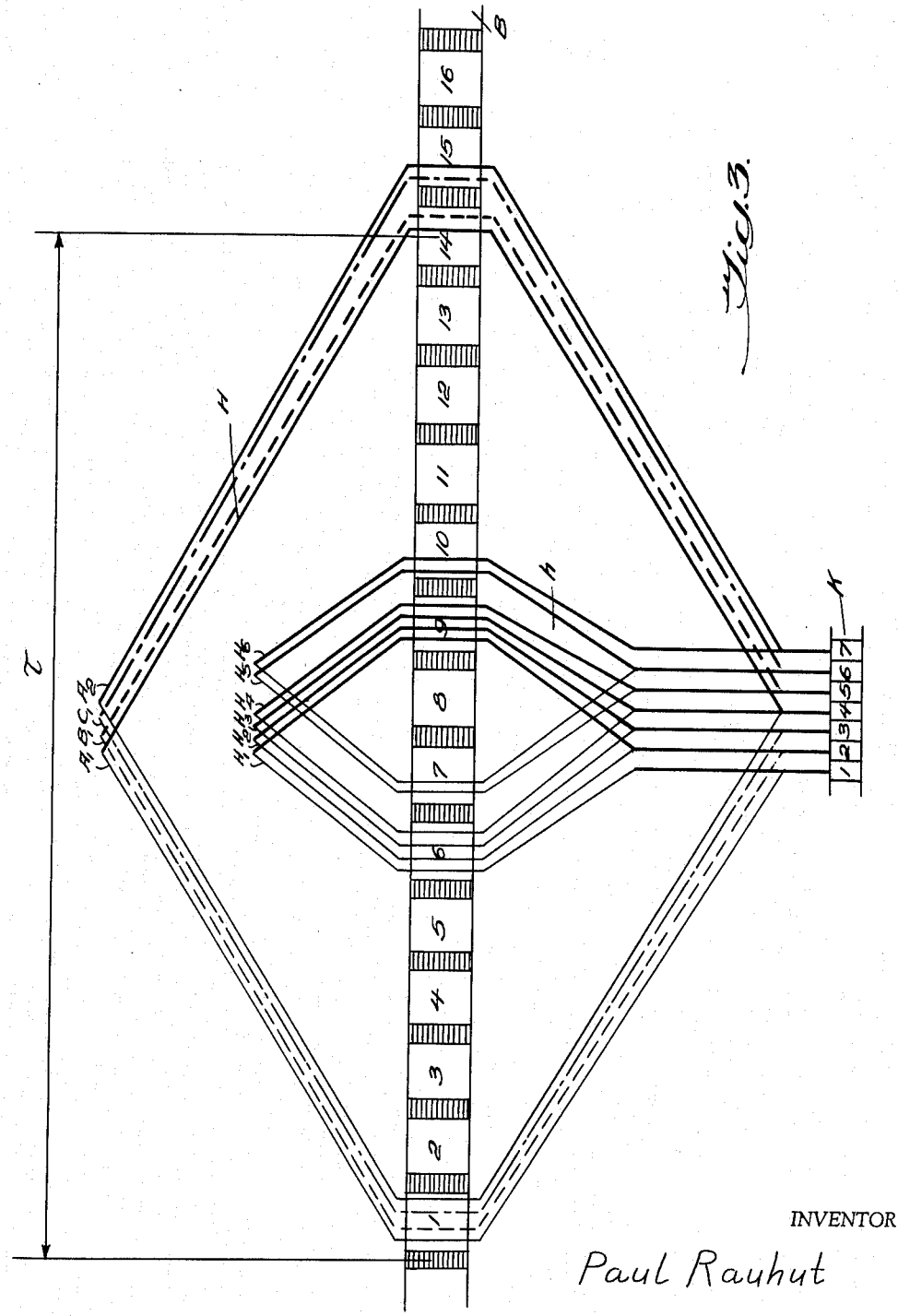
INVENTOR
Paul Rauhut
BY Pierce, Scheffler & Parker
ATTORNEYS

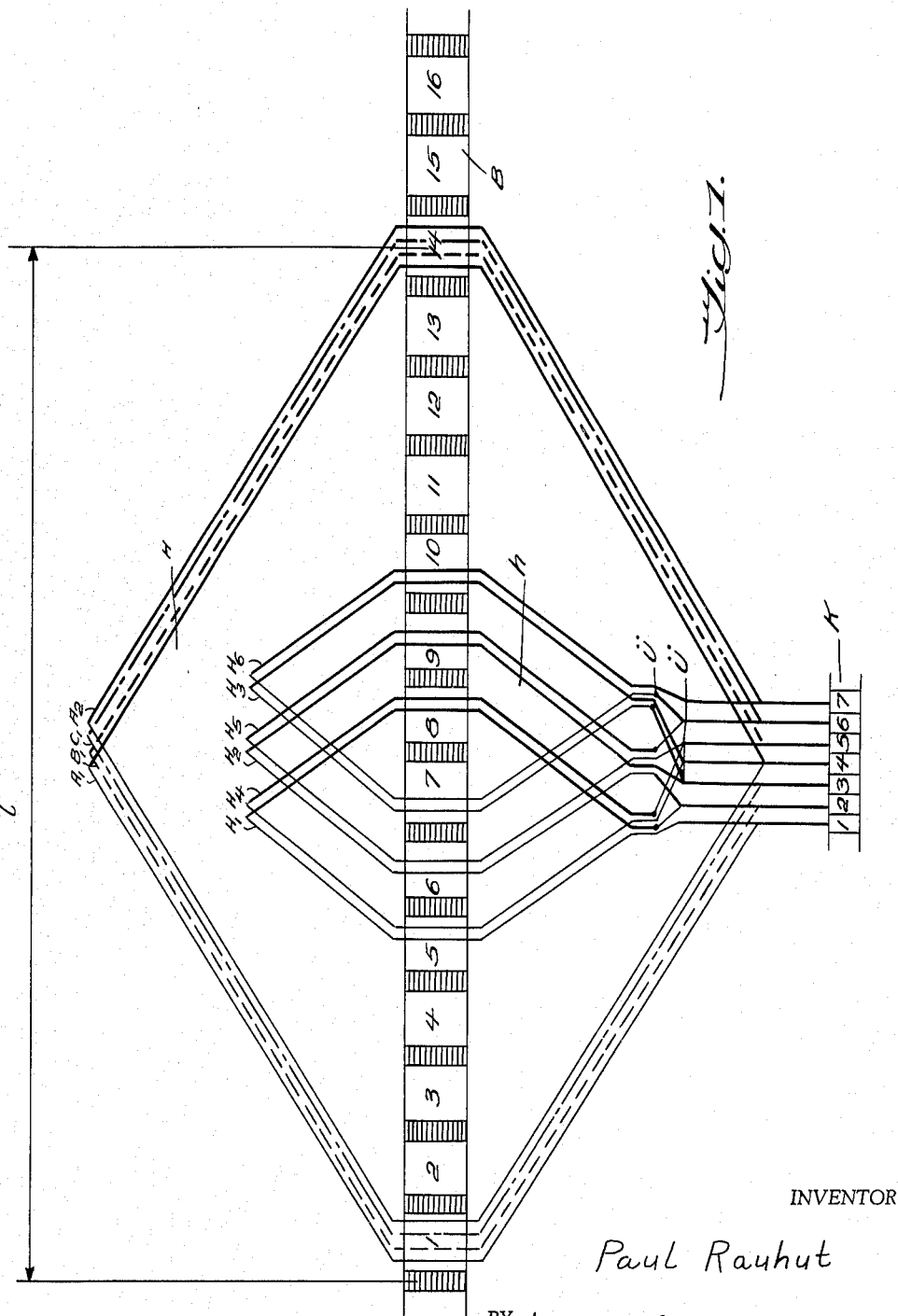

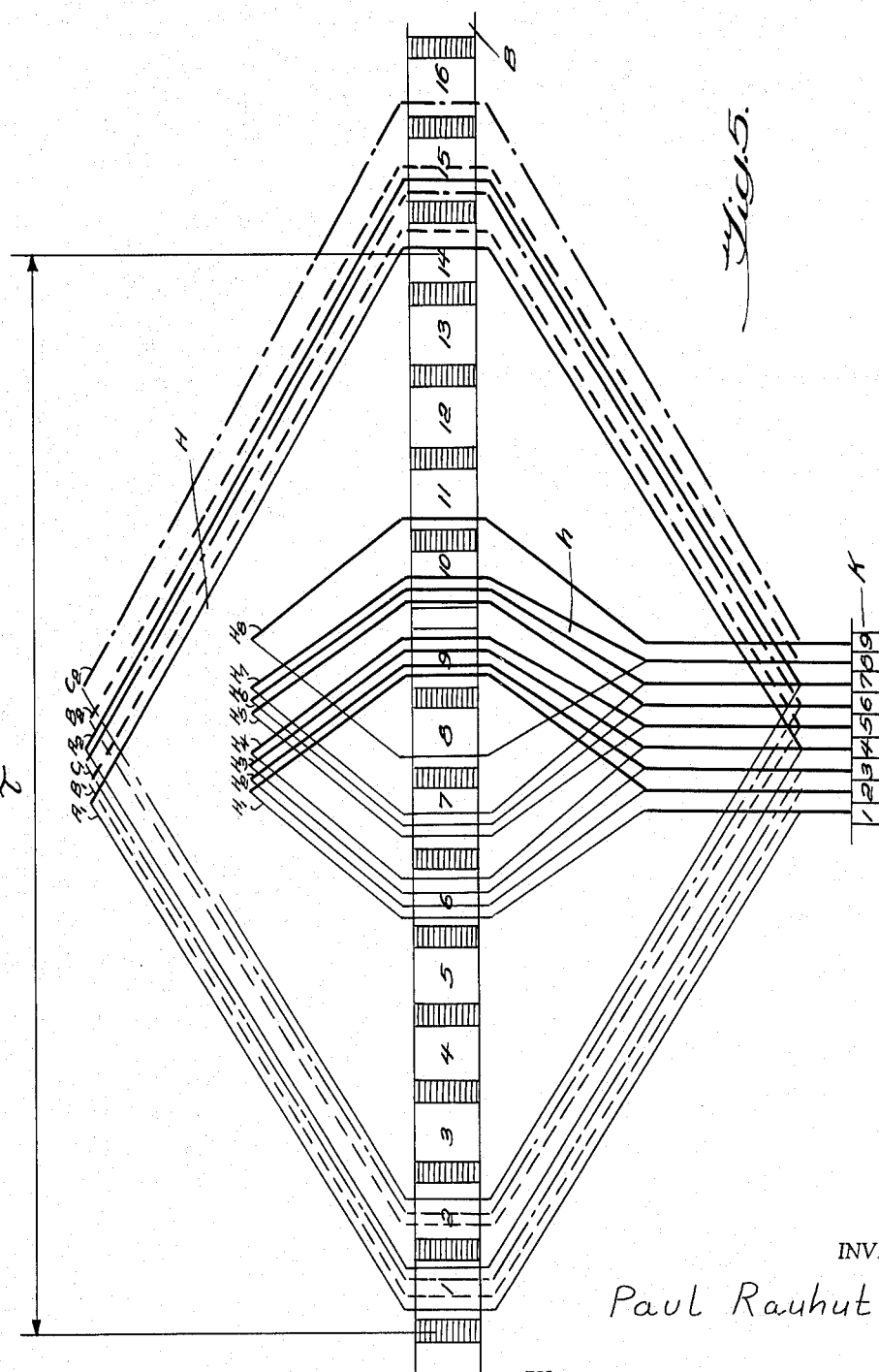

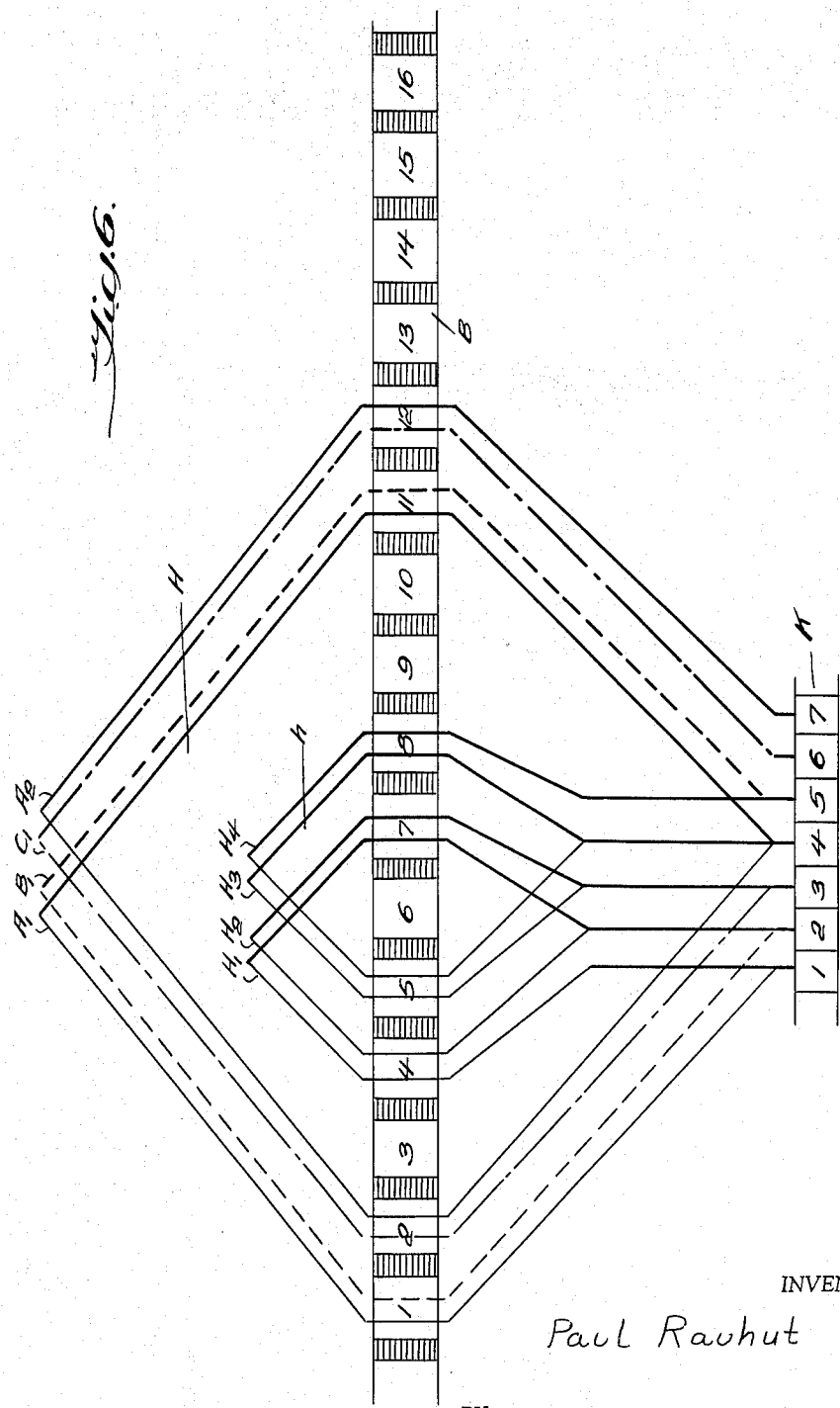

United States Patent Office 3,255,368
Patented June 7, 1966

3,255,368
ARMATURE WINDING FOR ALTERNATING
CURRENT COMMUTATOR MACHINE
Paul Rauhut, Ennetbaden, Switzerland, assignor to Aktiengesellschaft Brown, Boveri & Cie, Baden, Switzerland, a joint-stock company
Filed Mar. 3, 1960, Ser. No. 12,538
Claims priority, application Switzerland, Mar. 5, 1959, 70,407
1 Claim. (Cl. 310—205)

This invention relates to electrical machines of the commutator type for use on alternating current and in particular to such machines wherein the rotors are provided with multiple parallel windings.

In alternating current commutator machines, an upper limit value for the so-called transformer lamination voltage, i.e., the voltage generated between two neighboring laminations by the change of the main flux, must be observed. The reason for this limit resides in the short-circuiting of the laminations by the carbon brushes, which may result in excessive sparking, burning of laminations, or impermissible heating of the commutator. In three-phase commutators, for example, the limit value for the permanently permissible lamination voltage is 2 volts, provided the brushes are narrow. In a single parallel winding, one turn lies between two neighboring laminations. The main flux linked therewith is calculated from the lamination voltage with consideration of the frequency and of the chording factor. Therefore, the main flux cannot be increased beyond a certain value. This restriction limits also the output per pole that can be attained as a maximum. In many cases, however, it would be desirable to force this limit value up, for example for the construction of motors of great output or of high speed of rotation. Or one is forced to increase the flux per pole because otherwise the breakdown torque would be insufficient, a difficulty which arises especially at high line frequency (60 cycles). A possibility of increasing the flux consists in the use of the multiple parallel winding. In an $n$-multiple parallel winding ($n$ equals $a/p$, where $2a$ is the number of parallel branches and $2p$ the number of poles), there are located, between the two laminations to which a turn is connected, $n-1$ other laminations, so that, therefore, the turn voltage is the $n$-multiple of the lamination voltage. By transition to such a winding, the flux per pole and hence the output per pole can be increased to roughly the $n$-multiple. The advantage is obvious. In multiple parallel windings, however, it is necessary to couple the parallel branches together as rigidly as possible, because otherwise the commutation occurs in many coils, resulting in an impermissibly high reactance voltage. To remedy this, compensating connectors or an auxiliary winding must be provided for the purpose of interconnecting the neighboring laminations by the shortest path. If the machine does not have any salient poles, there may be used as auxiliary winding a single parallel winding with correspondingly shortened section. One turn each thereof then couples two branches of the main winding. For the principle of such arrangements it is then of minor importance whether a loop or wave or frog leg winding, etc., is used, whether the auxiliary winding is connected on the commutator side or on the opposite side, how wide the brushes are, whether leakage webs are inserted in the slots between main and auxiliary winding, or whether the iron packet is subdivided and a change of pitch of the turns takes place from packet to packet.

In the Bulletin of the Swiss Electrotechnical Society (Schweizerischer Elektrotechnischer Verein) of March 24, 1943, Hidde K. Schrage writes about "Multiple Parallel Windings for Rotary Field Commutator Machines." He there discusses the laws which such windings must obey. Specifically, with respect to the Schrage motor, where not only the commutator winding used for the change of speed but also the three-phase primary winding is lodged in the same slots, Schrage has stated in tables for several slots numbers those slot pitches for the main and auxiliary windings which are compatible with one another. From this it is evident that the choice is limited. In addition, there is the limitation that only in some windings with full pitch of the main winding the auxiliary winding can be designed with unidirectional progression. In most cases, especially when the pitch of the main winding is shortened, which is desired for increase of the flux, there must be provided for the auxiliary winding a progression in the manner of a pilgrim step. This, however, results in very undesirable crossings in the coil heads. An example will explain this.

In the drawings which accompany this specification:

FIG. 1 is a schematic diagram of a triplex parallel winding of known construction;

FIG. 2 is a vector diagram related to the winding illustrated in FIG. 1;

FIG. 3 is a schematic diagram of one embodiment of a triplex parallel winding in accordance with the present invention;

FIGS. 4a, 4b and 4c are vector diagrams related to the triplex winding of FIG. 3;

FIGS. 5 and 6 are schematic diagrams of further embodiments of a triplex parallel winding in accordance with the invention; and FIGS. 7a and 7b are vector diagrams related to the triplex winding of FIG. 6.

With reference now to the drawings and to the known type of triplex parallel winding as illustrated in FIG. 1, the symbols appertaining thereto are as follows:

B, the iron sheet packet;
K, the commutator;
H, the main winding;
h, the auxiliary winding.

Let $N$=the number of slots per pole=13½
$n=a/p=3$
$k$=number of laminations per slot=4
$y_H$=slot pitch of the main winding=13
$y_h$=slot pitch of the auxiliary winding=3
$\tau$=pole division
$\theta$=phase displacement according to a slot division
    =$180°/N=180°/13½=13°\,20'$.

The winding fulfills the following laws formulated by Schrage:

(1) $n$ and $k$ do not have a common divisor.
(2) The main winding is designed as non-progressive winding, that is, all its turns have the same slot pitch.
(3) $n$ is an odd number; $y_H-y_h$ is an even number of slots.
(4) The ratio of pitch factors of the main and auxiliary windings is essentially equal to $1+2\cos\theta$, as the following verification shows.

$$\text{Ratio of the pitch factors} = \frac{\sin\left(13/13\tfrac{1}{2}\cdot 90°\right)}{\sin\left(3/13\tfrac{1}{2}\cdot 90°\right)}$$

$$= \frac{\sin 86°40'}{\sin 20°} = \frac{0.99831}{0.34202} = 2.9199$$

$$1+2\cos\theta = 1+2\cos 13°20' = 1+2\cdot 0.97304 = 2.9461$$

One sees that Condition 4 is fulfilled except for a small error.

One winding represented is, however, rather undesirable. The auxiliary winding possesses between the sheet packet B and the connections at the commutator K several crossing points and, a fact which is particularly undersirable, several transitions from the upper layer to the lower layer or vice versa (indicated by points $\ddot{u}$). The winding heads are "braided." Such a winding is very difficult and complicated to manufacture; the number of hours of labor is particularly high, and moreover, skilled operators of the highest wage class are required; the many crossing points must be carefully insulated so that no shorts will occur; this additional insulation is bulky, resulting in lack of space; and finally repairs are very precarious, a fact that is particularly important when trained personnel and good equipment are not available.

All windings which Schrage describes are based on the condition that the voltage of a turn of the main winding must be in phase with the sum of the turns of the auxiliary winding connected in parallel with it. This is easily seen from the example of FIG. 1. If E be the amount of voltage which would be induced by the main flux in a turn of full winding pitch (i.e., of 180° el.), then the voltage of a turn of the main winding (e.g., between the laminations 1 to 4)

$$=\vec{E}_H = \sin(13/13\tfrac{1}{2}\cdot 90°)\cdot \vec{E} = 0.99831\,\vec{E}$$

and the sum of the voltages of the parallelly connected turns of the auxiliary winding $$=\vec{E}_h = (\epsilon^{-j\theta}+1+\epsilon^{+j\theta})\cdot \sin(3/13\tfrac{1}{2}\cdot 90°)\cdot \vec{E}$$

$$=(1+2\cos\theta)\cdot \sin 20°\cdot \vec{E} = 2.94608\cdot 0.34202\cdot \vec{E} = 1.00762\cdot \vec{E}$$

The voltage of the main winding turn and the voltage sum of the auxiliary winding turns are thus equal in phase; the deviation in magnitude is 0.93%. The vector diagram of FIG. 2 is intended to illustrate these conditions. The numbers represent the laminations designations. 1–4' signifies the voltage of the turn of the main winding which lies between the laminations 1 and 4'; analogously 1–2, 2–3, 3–4 signify the voltages of the parallel turns of the auxiliary winding. The error voltage 4'—4 (shown exaggeratedly large in the diagram for clearer illustration) is in phase with the voltage 1–4' of the main winding.

It is true that such a winding has great advantages: increased flux, hence possibility of increasing the output per pole, etc.; extensive suppression of the higher harmonics since for these the vector diagram corresponding to FIG. 2, does not close; reduction of the reactance voltage by the damping effect of the auxiliary winding and the inductive coupling of the winding members short-circuited by the brushes with non-short-circuited winding members across the auxiliary and main windings. The braiding of the auxiliary winding, however, is a great disadvantage. It is the object of the invention to provide a multiple parallel winding which does not have this disadvantage, yet preserves the above-mentioned advantage. This is rendered possible by dropping the restricting conditions which Schrage says are a basic condition for execution. Then, however, the principle of only permitting an error voltage which is cophasal with the turn voltage of the main winding must be abandoned. With the admission of a phase deviation also for the error voltage, entirely novel windings result. The invention makes use of this realization. It relates to a multiple parallel winding for rotors of alternating current commutator machines which has a slot pitch deviating from 180° el. and is connected in parallel with a single parallel winding as auxiliary winding; it is characterized in that the progression of the auxiliary winding is generally unidirectional and that between a turn of the main winding and the parallelly connected turns of the auxiliary winding a voltage difference is permitted which at least in part exists also according to phase, namely, in such a way that for one portion of the main winding, the error voltage leads and for another portion lags in relation to the turn voltage of the fundamental harmonic. Such windings include two groups. In both groups, the auxiliary winding has one kind of slot pitch. In the first group, the slot pitch of the main winding is in part smaller and in part greater than 180° el., and the error voltage is partly cophasal (except for the sign), partly leading, and partly lagging compared to the turn voltage of the main winding. Here and elsewhere in the specification the abbreviation "el." means "electrical degrees." In the second group, the slot pitch of all turns of the main winding is of the same magnitude (smaller or greater than 180° el.) and the error voltage is partly leading and partly lagging. According to the invention, turns of the main winding and of the auxiliary winding in such multiple parallel windings may be omitted in such a way that the error voltage remains as small as possible.

FIG. 3 shows schematically an example of construction of a triple parallel winding of the first group. The number of poles, slots, and laminations is the same as in the example of the "braided" winding. As in FIG. 1, therefore:

$$n=3;\ N=13\tfrac{1}{2};\ k=4;\ y_h=3;\ \theta=13°20'$$

In contrast to FIG. 1, however, the mainwinding is designed as progressive winding, that is, in contradiction to Conditions 2 and 3. Hence also Condition 4 cannot be maintained. The slot pitch of the main winding is in part shortened by ½-slot division in relation to the pole division, and in part lengthened by the same amount. Hence, $y_H = 13$ or 14, respectively.

In the auxiliary winding the progression is, in contrast to the "braided winding," generally unidirectional and like the main winding exclusively advancing. It would have been possible also to make both windings moving backward.

Between laminations 1 and 4 the following voltage is built up:

Through turn $A_I$ of the main winding $$\vec{E}_{H14} = \sin(13/13\tfrac{1}{2}\cdot 90°)\cdot \vec{E} = 0.99831\cdot \vec{E}$$

Through turns $H_1$, $H_2$ and $H_3$ of the auxiliary winding $$\vec{E}_{h14} = 3\cdot \sin(3/13\tfrac{1}{2}\cdot 90°)\cdot \vec{E} = 3\cdot 0.34302\cdot \vec{E} = 1.02606\cdot \vec{E}$$

The sum voltage $\vec{E}_{h14}$ is in phase with $\vec{E}_{H14}$. The error voltage $\vec{E}_{h14} - \vec{E}_{H14}$ is cophasal with $\vec{E}_{H14}$ and amounts to 2.78%. These relationships are illustrated in the vector diagram of FIG. 4a. Therein the numbers correspond to the lamination designations, with the symbols 1–4' signifying the voltage $\vec{E}_{H14}$ of turn $A_1$ of the main winding; 1–2, 2–3, 3–4, the voltages of the turns $H_1$, $H_2$, $H_3$ of the auxiliary winding, so that 1–4 represents the sum voltage $\vec{E}_{h14}$.

$$\vec{E}_{H14} = 1\text{–}4'\ \text{and}\ \vec{E}_{h14} = 1\text{–}4$$

are cophasal. The error voltage 4'–4 is likewise cophasal.

Between laminations 2 and 5 the voltages are in exactly the same relative position as between laminations 1 and 4.

Between laminations 3 and 6 the following voltage is built up:

Through turn $C_1$ of the main winding $$\vec{E}_{H36} = \sin(13/13\tfrac{1}{2} \cdot 90°) \cdot \vec{E} \cdot \epsilon^{+j\theta/2} = 0.99831 \cdot \vec{E} \cdot \epsilon^{+j\theta/2}$$

Through turns $H_3$, $H_4$ and $H_5$ of the auxiliary winding $$\vec{E}_{h36} = (1 + 1 + \epsilon^{+j\theta}) \cdot \sin(3/13\tfrac{1}{2} \cdot 90°) \cdot \vec{E}$$
$$= (2\epsilon^{-j\theta/2} + \epsilon^{+j\theta/2}) \cdot \sin 20° \cdot \vec{E} \cdot \epsilon^{+j\theta/2}$$
$$= (3 \cos 6°40' - j \sin 6°40') \cdot 0.34202 \cdot \vec{E} \cdot \epsilon^{+j\theta/2}$$
$$= (1.01812 - j0.03971) \cdot \vec{E} \cdot \epsilon^{+j\theta/2}$$

The sum voltage $\vec{E}_{h36}$ lags relative to the voltage $\vec{E}_{H36}$. The error voltage finally is $$\vec{E}_{h36} - \vec{E}_{H36} = (0.01981 - j0.03971) \cdot \vec{E} \cdot \epsilon^{+j\theta/2}$$

It lags relatively to the turn voltage $E_{H36}$ of the main winding and amounts to 4.45% thereof. These relationships are illustrated in the vector diagram of FIG. 4b. The numbers shown again relate to the respective laminations. The symbols 3–6' signify the voltage $\vec{E}_{H36}$ of turn $C_1$ of the main winding; 3–4, 4–5, 5–6, the voltages of the turns $H_3$, $H_4$, $H_5$ of the auxiliary winding with the sum voltage 3–6 corresponding to $\vec{E}_{h36}$. The latter lags behind 3–6'. The error voltage 6'–6 likewise lags.

Analogously, the voltage between laminations 4 and 7 can be examined.

Turn $A_2$ of the main winding furnishes $$\vec{E}_{H47} = \vec{E}_{H35} = 0.99831 \cdot \vec{E} \cdot \epsilon^{+j\theta/2}$$

Turns $H_4$, $H_5$ and $H_6$ of the auxiliary winding furnish $$\vec{E}_{h47} = (1 + 2 \cdot \epsilon^{+j\theta}) \cdot \sin(3/13\tfrac{1}{2} \cdot 90°) \cdot \vec{E}$$
$$= (1.01812 + j0.03971) \cdot \vec{E} \cdot \epsilon^{+j\theta/2}$$

The sum voltage $\vec{E}_{h47}$ is of the same magnitude as $\vec{E}_{h36}$, but in contrast to it, it leads relative to the voltage $\vec{E}_{H47}$. The error voltage is $$\vec{E}_{h47} - \vec{E}_{H47} = (0.01981 + j0.03971) \cdot \vec{E} \cdot \epsilon^{+j\theta/2}$$

It leads in relation to the turn voltage $\vec{E}_{H47}$ of the main winding and again amounts to 4.45% thereof. The vector diagram FIG. 4c represents these relations. It is analogous to FIG. 4b.

In the new multiple parallel winding, the auxiliary winding need not be braided. The latter is a normal winding with generally unidirectional progression. Such a winding is much simpler and cheaper than a braided winding; it requires no special precautions concerning the insulation, is safe in operation, and if damaged can be repaired without difficulties. It fulfills all requirements of a compensating winding: By the alternating connection of the various turns of the main winding to the laminations, the potential distribution at the commutator would be insufficiently fixed, but it is fixed by the auxiliary winding because the latter determines over the entire commutator circumference the potential of those laminations which are present between the two laminations to which any desired turn of the main winding is connected; moreover, the auxiliary winding reduces the commutation voltage, because it provides that the operating current is taken over by the shortest path from one lamination to the next, and because the commutating coils are coupled with the other winding parts by the auxiliary winding, owing to which an additional damping is achieved; lastly the auxiliary winding brings about an intensive damping of the higher harmonics, since each turn of the main winding represents together with the parallelly connected turns of the auxiliary winding a short-circuit circuit for the harmonics foreign to the fundamental. The advantages of the new winding are important. With respect to the error voltage of 2.8% or 4.5% there are no objections. The compensating current caused by it is small. It does not result in disturbances; nor are any additional losses produced which are of importance. With the number of slots per pole selected in the example, a three-phase winding may be inserted in the same slots, so that the represented multiple-parallel winding can be used for a rotor-fed shunt commutator motor where the primary winding lies in the rotor. Naturally, the winding can be used also for other motor types, e.g., the stator-fed communtator motor with a shunt or series connection system. Leakage webs may then be inserted in the slots between the main winding and auxiliary winding as desired. Incidentally, one has a wide choice for the number of slots in stator-few motors because no other winding need be lodged in the rotor slots. Such motors, therefore, afford more possibilities of making use of the arrangement according to the invention. The application of the new winding involves also other liberties, the exercise of which does not go beyond the scope of the invention. This includes the following examples. It is not necessary to carry out all turns of the auxiliary winding; one may limit oneself to a part thereof. The auxiliary winding may be connected on the side opposite the commutator. The main winding or the auxiliary winding or both may be designed as wave winding or frog leg winding or the like and thus save compensating connectors of the first kind (so-called Mordey connectors). The carbon brushes may be made very narrow, so that their overlap practically represents only one lamination division or a little more; in special cases they may be made wider, so that the operating current is always conducted to all current branches of the main winding directly. Also the sheet packet may be subdivided axially in a suitable ratio, so that a fitting change of pitch of the main and/or auxiliary winding from partial packet to partial packet can be made.

Comparing FIG. 3 with FIG. 1, it is striking to note that the new winding is practically applicable in the place of the known. Thus one can utilize the advantages of the multiple parallel winding with auxiliary winding and at the same time benefit by the advantages of the unbraided windings.

A variant of the new winding according to the invention results from the omission of turns of the main and auxiliary windings. Thus, if needed, adaptation is possible for example to a commutator of a different number of laminations. An example of construction is represented schematically in FIG. 5. Thus winding has been developed from the one previously described by suppression of the following turns; one turn of the main winding with shortened pitch (in slots 2 and 15) and a turn of the auxiliary winding in phase with it (in slots 7 and 10). Of course, it would have been possible also to dispense with the other and/or different winding members. How many and which winding parts are to be eliminated should advantageously be tested from case to case. For example, it may be assumed for FIG. 5 that compared with FIG. 3 one turn to every twelve turns is omitted. The symmetry in relation to the rotary field is thus preserved in the arrangement of FIG. 5, and the winding is conveniently applicable to a Schrage motor. Any other eliminations could have been made, too, for example, one turn to every six turns. At any rate one must omit an equal number of turns for the main and auxiliary windings. For this purpose, it will be advantageous to select the turns in such a way that the error voltages for the remaining winding will be as small as possible. The space remaining free in the slots due to the fact that turns are omitted can be filled out in any way. For example, the following possibilities exist: filling wedges of copper or other metal, insulated or not insulated; filling wedges of wood or the like; enlargement of the cross-section of the rods remaining in the slots.

The invention is not limited to the windings shown. One is free in the selection of other data for the number of slots, number of wires per slot and layer, the pitches, etc., so that instead of 4 laminations 3 or 5 per slot are possible or respectively a mixed number, etc. Moreover, not only windings with $n=3$ can be constructed, but also windings with other values of $n$.

An example of construction for the second group of the invention is represented diagrammatically in FIG. 6. The data are:

$$n=3, \; N=18, \; k=2$$

$$y_H=10, \; y_h=3, \; \theta=\frac{180°}{10}=10°$$

The main winding is here designed as non-progressive winding. Conditions 1, and 2, of Schrage are fulfilled, but not condition 3. In fact, $y_H-y_h=10-3=7$ is an odd number. The fourth condition formulated by Schrage for the error voltage would still be well fulfilled, yet no winding can be drawn where the error voltage would be cophasal with the turn voltage of the main winding, as would be Schrage's intention. According to Schrage, it would have been necessary to braid also the auxiliary winding. However, admitting a phase-displaced error voltage, it becomes possible to construct the auxiliary winding with unidirectional progression, that is, unbraided. That the main and auxiliary windings fit together is shown by the following verification.

Between the laminations the following voltage is built up:

Through turn $A_1$ of the main winding $$\vec{E}_{H14}=\sin(10/18 \cdot 90°) \cdot \vec{E}=\sin 50° \cdot \vec{E}=0.76604 \cdot \vec{E}$$

Through turns $H_1$, $H_2$ and $H_3$ of the auxiliary winding $$\vec{E}_{h14}=(2\epsilon^{-j\theta/2}+\epsilon^{+j\theta/2}) \cdot \sin(3/18 \cdot 90°) \cdot \vec{E}$$
$$=(3\cos 5° - j \sin 5°) \cdot \sin 15° \cdot E$$
$$=(0.77350-j\, 0.02256) \cdot E$$

The sum voltage lags in relation to the voltage $\vec{E}_{H14}$. Finally the error voltage is $$\vec{E}_{h14}-\vec{E}_{H14}=(0.00746-j\, 0.02256) \cdot \vec{E}$$

It lags in relation to the turn voltage $\vec{E}_{H14}$ of the main winding and amounts to 3.1% thereof. The vector diagram of FIG. 7a serves to illustrate these conditions. The added numbers relate to the respective laminations. The symbols signify, 1–4', the voltage $\vec{E}_{H14}$ of turn $A_1$ of the main winding; 1–2, 2–3, 3–4, the voltages of the turns $H_1$, $H_2$, $H_3$ of the auxiliary winding with the sum voltage 1–4 corresponding to $\vec{E}_{h14}$. The latter lags behind 1–4'. The error voltage 4'–4 also lags.

Analogously the voltage between laminations 2 and 5 can be examined.

Turn $B_1$ of the main winding furnishes $$\vec{E}_{H25}=\vec{E}_{H14}=0.76604 \cdot \vec{E}$$

Turns $H_2$, $H_3$ and $H_4$ of the auxiliary winding furnish $$\vec{E}_{h25}=(\epsilon^{-j\theta/2}+2\epsilon^{+j\theta/2}) \cdot \sin(3/18 \cdot 90°) \cdot \vec{E}$$
$$=(0.77350-j\, 0.02256) \cdot \vec{E}$$

The sum voltage $\vec{E}_{h25}$ is of the same magnitude as $\vec{E}_{H25}$, but in contrast to the above, it leads in relation to the voltage $\vec{E}_{H25}$. The error voltage is $$\vec{E}_{h25}-\vec{E}_{H25}=(0.00746+j\, 0.02256) \cdot \vec{E}$$

It leads in relation to the voltage $\vec{E}_{H25}$ of the main winding and again amounts to 3.1% thereof. The vector diagram of FIG. 7b illustrates these relationships. It is analogous to FIG. 7a. It is striking to note that there are two phase-displaced error voltages, equal in magnitude, only displaced by the same electrical angle in one instance leading and in the other lagging in relation to the respective turn voltage of the main winding. This feature applies also to the two examples shown before. Concerning the example of FIG. 6, the same remarks apply analogously that were made concerning the other examples.

I claim:

In a winding structure for the rotor of an alternating current commutator machine the combination comprising an $n$-multiple parallel main winding having a slot-pitch which is part less and in part greater than 180 electrical degrees, and a single parallel winding connected in parallel with said main winding as an auxiliary winding, the progression of said auxiliary winding being unidirectional and all turns thereof having the same slot pitch corresponding to a voltage of $1/n$th of the voltage of one turn of said main winding, said auxiliary winding being so arranged in relation to said main winding that the sum of the voltages of those turns of said auxiliary winding which are connected in parallel with a turn of said main winding is in relation to the latter partly cophasal, partly leading and partly lagging, and some of the turns of said main winding having a slot pitch less than 180 electrical degrees being omitted together with the turns of said auxiliary winding lying in phase therewith.

References Cited by the Examiner

UNITED STATES PATENTS 2,272,749   2/1942   Lane et al. _____ 310—206 X
2,311,700   2/1943   Schwarz _____ 310—173

FOREIGN PATENTS 660,431   5/1938   Germany.

ORIS L. RADER, *Primary Examiner.*

MILTON O. HIRSHFIELD, *Examiner.*

D. F. DUGGAN, G. P. HAAS, G. SIMMONS,
*Assistant Examiners.*